US011853757B2

(12) United States Patent
Burylov et al.

(10) Patent No.: US 11,853,757 B2
(45) Date of Patent: Dec. 26, 2023

(54) VECTORIZATION OF LOOPS BASED ON VECTOR MASKS AND VECTOR COUNT DISTANCES

(71) Applicant: Intel Corporation, Santa Clara, CA (US)

(72) Inventors: Ilya Burylov, Nizhny Novgorod (RU); Mikhail Plotnikov, Nizhny Novgorod (RU); Hideki Ido, Sunnyvale, CA (US); Ruslan Arutyunyan, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 16/811,011

(22) Filed: Mar. 6, 2020

(65) Prior Publication Data

US 2020/0210183 A1 Jul. 2, 2020

(51) Int. Cl.
*G06F 8/41* (2018.01)
*G06F 9/30* (2018.01)
*G06F 9/32* (2018.01)

(52) U.S. Cl.
CPC ........ *G06F 9/30036* (2013.01); *G06F 8/4441* (2013.01); *G06F 8/4452* (2013.01); *G06F 9/30018* (2013.01); *G06F 9/30065* (2013.01); *G06F 9/321* (2013.01)

(58) Field of Classification Search
None
See application file for complete search history.

(56) References Cited

U.S. PATENT DOCUMENTS

| 11,436,010 | B2* | 9/2022 | Plotnikov | G06F 9/3838 |
| 2014/0095850 | A1* | 4/2014 | Plotnikov | G06F 9/38 712/241 |
| 2014/0281401 | A1* | 9/2014 | Hughes | G06F 9/30152 712/210 |
| 2015/0324292 | A1* | 11/2015 | Krishnaiyer | G06F 12/0862 711/137 |
| 2018/0246722 | A1* | 8/2018 | Plotnikov | G06F 9/30018 |
| 2021/0397454 | A1* | 12/2021 | Plotnikov | G06F 9/3838 |

* cited by examiner

*Primary Examiner* — Marina Lee
(74) *Attorney, Agent, or Firm* — Jordan IP Law, LLC

(57) ABSTRACT

Systems, apparatuses and methods may provide for technology that identifies that an iterative loop includes a first code portion that executes in response to a condition being satisfied, generates a first vector mask that is to represent one or more instances of the condition being satisfied for one or more values of a first vector of values, and one or more instances of the condition being unsatisfied for the first vector of values, where the first vector of values is to correspond to one or more first iterations of the iterative loop, and conducts a vectorization process of the iterative loop based on the first vector mask.

25 Claims, 12 Drawing Sheets

```
for(i=0, k=0; i<N; i++) {
    x[i] = k;         ⎯⎯ 354
    if(condition(i)) { ⎯⎯ 356
        k++;
    }else{         ⎯⎯ 358
        k = 0;
    }
}
```

| | | | | | | | | |
|---|---|---|---|---|---|---|---|---|
| ← 368 Offset | 7 | 6 | 5 | 4 | 3 | 2 | 1 | 0 |
| ← 362 Input | 0 | 1 | 1 | 1 | 0 | 0 | 1 | 1 |
| V1 = Vpbroadcastm(k1) | 01100110 | 01100110 | 01100110 | 01100110 | 01100110 | 01100110 | 01100110 | 01100110 |
| V2 = vpsllv(v1, vcount) // ← 364 Vcount = (1, 2, 3, 4, 5, 6, 7, 8) | 11001100 | 11001100 | 10011000 | 00110000 | 01100000 | 11000000 | 10000000 | 00000000 |
| V3 = vpandn (v2, vones) // vones = (11111111) | 00011001 | 00110011 | 01100111 | 11001111 | 10011111 | 00111111 | 01111111 | 11111111 |
| ← 366 Vdistance = vplzcnt(v3) | 3 | 2 | 1 | 0 | 0 | 2 | 1 | 0 |

| | | | | | | | | |
|---|---|---|---|---|---|---|---|---|
| k1 | 0 | 1 | 1 | 0 | 0 | 0 | 1 | 1 |
| k2 = k1+1 | 0 | 1 | 1 | 0 | 0 | 1 | 0 | 0 |
| k3 = kXOR(k1, k2) | 0 | 0 | 0 | 1 | 1 | 1 | 1 | 1 |
| k1_prev | 1 | 0 | 1 | 0 | 1 | 1 | 0 | 0 |
| k4 = knot(k1_prev) | 0 | 1 | 0 | 1 | 0 | 0 | 1 | 1 |
| Base_dist = lzcnt(k4) | 0 | 0 | 0 | 0 | 2 | 2 | 2 | 2 |
| vtmp{k3}{z} = broadcast(base_dist) | 3 | 2 | 0 | 0 | 2 | 2 | 2 | 2 |
| vdistance | 3 | 2 | 1 | 0 | 2 | 1 | 0 | 2 |
| Vdistance{k3} = vpadd(vdistance, vtmp) | | | | 2 | 4 | 3 | 2 | |

Correction analysis
398

```
for(i=0, k=0; i<N; i++) {
    x[i] = generate_rng();
    if(condition( x[i] )) {
        y[k++] = generate_rng();
    }
}
```

- 402: `for(i=0, k=0; i<N; i++) {`
- 404: `x[i] = generate_rng();`
- 406: `if(condition( x[i] ))`
- 408: `y[k++] = generate_rng();`

| | e0 | e1 | e2 | e3 | e4 | e5 | e6 | e7 | e8 | e9 | e10 | e11 | e12 | e13 | e14 | e15 | e16 | e17 | e18 | e19 | e20 | e21 | e22 | e23 |
|---|---|---|---|---|---|---|---|---|---|---|---|---|---|---|---|---|---|---|---|---|---|---|---|---|
| Sequence of Random Numbers (456) | e0 | e1 | e2 | e3 | e4 | e5 | e6 | e7 | e8 | e9 | e10 | e11 | e12 | e13 | e14 | e15 | e16 | e17 | e18 | e19 | e20 | e21 | e22 | e23 |
| Condition Evaluated (comparison mask) (458) | 0 | 0 | 1 | * | * | * | 1 | * | * | * | 0 | 0 | 1 | * | 0 | 1 | * | 1 | 0 | 1 | * | 0 | 0 | 1 |
| Vdistance (460) | 0 | 0 | 0 | 1 | 2 | 3 | 4 | 5 | 6 | 7 | 8 | 0 | 0 | 1 | 2 | 0 | 1 | 2 | 3 | 4 | 5 | 6 | 0 | 0 |
| Output distribution (462) | x0 | x1 | x2 | y0 | x3 | y1 | x4 | y2 | x5 | y3 | x6 | x7 | x8 | y4 | x9 | x10 | y5 | x11 | y6 | x12 | y7 | x13 | x14 | x15 |
| X mask (464) | 1 | 1 | 1 | 0 | 1 | 0 | 1 | 0 | 1 | 0 | 1 | 1 | 1 | 0 | 1 | 1 | 0 | 1 | 0 | 1 | 0 | 1 | 1 | 1 |
| Y mask (466) | 0 | 0 | 0 | 1 | 0 | 1 | 0 | 1 | 0 | 1 | 0 | 0 | 0 | 1 | 0 | 0 | 1 | 0 | 1 | 0 | 1 | 0 | 0 | 0 |
| Loop Iteration | 0 | 1 | 2 | 2 | 3 | 3 | 4 | 4 | 5 | 5 | 6 | 7 | 8 | 8 | 9 | 10 | 10 | 11 | 11 | -- | -- | -- | -- | -- |

First Vector Chunk 468 | Second Vector Chunk 470 | Third Vector Chunk 472

450

… (1)

VECTORIZATION OF LOOPS BASED ON VECTOR MASKS AND VECTOR COUNT DISTANCES

TECHNICAL FIELD

Embodiments generally relate to efficiency enhanced implementations of computer code. More particularly, embodiments relate to vectorizing loops with backward cross-iteration dependencies.

BACKGROUND

Some computer code may have loops with backward cross-iteration dependencies. Such loops may include loops that depend on a condition to execute and/or depend on a previous iteration of the computer code to execute. Such loops may prove problematic to unroll and execute in a vectorized fashion. For example, such loops may be difficult to vectorize for parallel execution.

BRIEF DESCRIPTION OF THE DRAWINGS

The various advantages of the embodiments will become apparent to one skilled in the art by reading the following specification and appended claims, and by referencing the following drawings, in which:

FIG. 3A shows an example of a computer code that may be enhanced for vectorized execution according to an embodiment;

FIG. 3B shows illustrates a more detailed analysis of the computer code according to an embodiment;

FIG. 3D shows exemplary commands and operations to execute a vectorization process on the computer code according to an embodiment;

FIG. 4A illustrates a computer code that includes a dependency represented by a loop according to an embodiment;

FIG. 4B illustrates operations to identify a distribution of values according to the computer code according to an embodiment;

DESCRIPTION OF EMBODIMENTS

Figure 1:
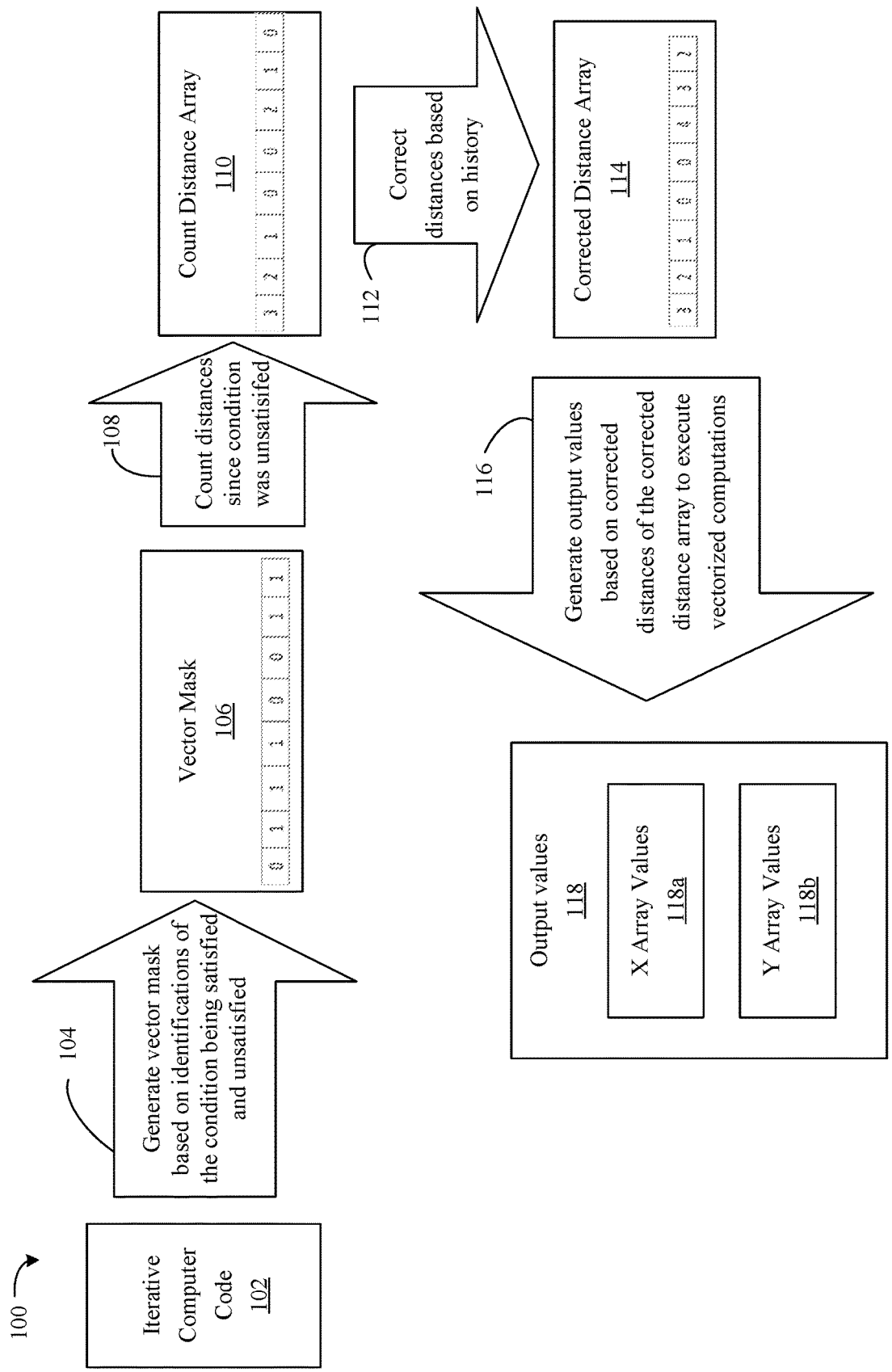
FIG. 1 is an example of a vectorization process to vectorize iterative computer code according to an embodiment.

FIG. 1 illustrates a vectorization process 100 to vectorize (e.g., put data and computer code into a vectorized format such as a vector chunk) iterative computer code 102 and compute output values (e.g., by processing one operation on multiple pairs of operands that are part of a same vector chunk) in a vectorized operation of the vectorized chunk. Vectorization may include converting a computer program from a scalar implementation, which processes a single pair of operands at a time, to a vector implementation, which processes one operation on multiple pairs of operands at once. A vector chunk may include a fixed number of loop iterations and/or elements that executes in a single vector implementation.

In process 100, the iterative computer code 102 may include backward cross-iteration dependencies. Backward cross-iteration dependencies may include an existence of dynamic data dependency of a given loop iteration on a previous loop iteration, thus making it difficult to ascertain or predict output values and/or memory locations (e.g., an X array, Y array, values of variables, etc.) of the given loop iteration. For example, iterative computer code 102 may include a first code portion that when executed, causes modification of one or more of an array or a value of a variable. Conventional approaches to vectorization may execute on a fixed number of loop iterations, called a vector chunk, generate a processor code (e.g., single instruction, multiple data instructions and/or code) for the vector chunk and then process the whole iteration space by processing each vector chunk. Such conventional approaches may be difficult if not impossible to apply to iterative code that includes backward cross-iteration dependencies since the extent of the code operations may not be fully understood or represented at the time of vectorization. As such, even the existence of vector API (e.g., such as with C++ and/or C++ 23) for value generation (e.g., random number API) may not be sufficient to mitigate the above. For example, it may be unclear how many times a conditional loop may execute conditional branch or the output values of the conditional loop due to the backwards cross-iteration dependencies.

In contrast, process 100 may efficiently vectorize loops of the iterative computer code 102 with backward cross-iteration dependencies based on an analysis of the iterative computer code 102. Notably, the analysis may identify and preserve cross-iteration dependencies so that each vector chunk (which may include a vector of values) between a first and last vector chunk is able to execute speculatively (e.g., separately from a directly preceding vector chunk and a directly following vector chunks based on the identified cross-iteration dependencies). Afterwards, speculatively computed values may be updated (corrected) depending on a previous vector chunk if needed, by vector operations (e.g., update operation is executed on all vector elements at a time). After the update operation, final values may be calculated based on the corrected vector chunk and through a vector operation. Each vector chunk may include one or more iterations of a conditional loop that includes the backward cross-iteration dependencies. In doing so, efficiency may be enhanced since the iterative computer code 102 may be vectorized. The vector chunks may execute in parallel on different processing and/or execution units of a processor. Thus, each vector chunk may execute on a different processing unit and/or execution unit. The vector chunks may include a vector of values.

Further, the process 100 may accurately generate a number of values (e.g., random numbers that are the vector of values) that will be utilized by the loop. For example, the loop may utilize one of the values (e.g., store one of the random values in an array) if the condition is satisfied. While the condition may be evaluated each loop iteration, the values may only be utilized if the condition is satisfied. The process 100 may generate a vector of the values and identify a number of loop iterations (which may be referred to as a vector chunk), which consumes all these values based on whether the condition is satisfied or unsatisfied. The vector chunk of iterations may be of a variable size (e.g., a number of iterations contained within a vector chunk is variable), while a vector of generated values of the vector chunk is of a fixed size. In contrast, some conventional implementations may generate values (e.g., random numbers) for a fixed vector chunk of iterations resulting in variable number of values for each vector chunk of iterations. In such case, generating values based on the assumption that the condition will always be satisfied thus requiring the usage of the values in each iteration. Thus, conventional implementations may generate values which remain unused or need overhead to transfer remaining values to the next vector chunk of iterations in order to inefficiently vectorize such implementations. As such, the process 100 may reduce processing time and enhance computer resource usage while accurately processing the iterative computer code 102 in a vectorized format.

Process 100 may identify when the condition is satisfied (e.g., a first state) and unsatisfied (e.g., a second state) for a plurality of iterations of the iterative computer code 102. The instances of the first and second states may be stored in a mask array such as the vector mask 106. For example, the process 100 may generate the vector mask 106 based on identifications of the condition being satisfied and unsatisfied 104. The vector mask 106 may contain a series of values that corresponds to the condition being unsatisfied (e.g., the "0" values), and a series of values that correspond to the condition being satisfied (e.g., the "1" values). Each of the values of the vector mask 106 may correspond to an iteration (e.g., $0^{th}$ iteration, $1^{st}$ iteration, etc.) of the conditional loop. In some embodiments, more than one value may correspond to one iteration of the conditional loop depending on the exact implementations. Thus, the vector mask 106 may track "break points" in a code (e.g., when a condition is unsatisfied) during a particular evaluation of the condition (e.g., during different iterations) and a distance from the "break points."

The process 100 may count distances since the condition was unsatisfied 108 and stores the distances to a count distance array 110. As illustrated, the count distance array 110 may record the distance (e.g., a number of bit positions between different bit positions) of each to the nearest "0" value (e.g., unsatisfied condition) in the vector mask 106. Thus, the count distance array 110 may record a distance (e.g., number of bit positions) between a respective bit position in the vector mask 106 and a nearest preceding bit position in the vector mask 106 that is assigned a value ("0") that identifies the condition as being unsatisfied.

It is to be noted that initially, the zero position of the vector mask 106 does not have any other preceding bit positions in the vector mask 106. To compensate for this, the process 100 may assume a value of "0" to the right of bit position zero (e.g., that the condition was unsatisfied in a previous iteration). The count distance array 110 records a starting distance of "0" at position zero that is the rightmost position in the count distance array 110. That is, the count distance array 110 may default to a starting distance of "0" at position zero (e.g., assume that condition was unmet).

It will be understood that "position" as used herein may refer to the "bit position" in a respective data structure, such as the vector mask 106, count distance array 110 and corrected distance array 114. Thus, bit position zero may be the same as position zero, bit position one may be the same as position one, and so on. Bit position zero may be on a rightmost portion of a respective data structure while bit position seven may be stored on the leftmost portion of the respective data structure.

The first position of the count distance array 110 is a value of "1" since position zero (rightmost position) of the vector mask 106 has a value of "1," meaning the condition was satisfied, and the assumed value of "0" discussed above. The second position of the count distance array 110 is a value of "2" since positions one and zero of the vector mask 106 both have a value of "1," meaning the condition was satisfied in both evaluations of the condition. In contrast, the third position of the count distance array 110 is a value of "0" since position two of the vector mask 106 has a value of "0" meaning the condition was unsatisfied. Likewise, the remainder of the positions of the count distance array 110 may store distances to the nearest corresponding "0" in the vector mask 106.

The process 100 may correct the distances based on the history 112. As noted above, initially the count distance array 110 may assume no history or prior iterations and thus default value in position zero of the count distance array 110 to zero. This may not always be correct. To account for the history, the process 100 may retrieve a previous vector mask and/or previous count distance array that both correspond to directly preceding iterations (e.g., iterations that occur directly before the current iterations being processed).

A corrected distance array 114 may be generated based on the history 112 and the count distance array 110. For example, suppose that the previous count distance array stored a distance value of "1" in the last position (e.g., the seventh position or far left position), and the previous vector mask stored a value of "1" (condition met) in the last position (e.g., the seventh position or far left position). Then a value of "2" (to account for the distance of "1" in the last position of the previous count distance array and the value of "1" in the previous vector mask) may be added to the first three position of the count distance array 110 to account for the previous history. Thus, the first three positions of corrected distance array 114 may be "4, 3 and 2." That is, the value "0" in the count distance array 110 (position zero) may be modified to a "2" in the corrected distance array 114, the value "1" in the count distance array 110 (position one) may be modified to a "3" in the corrected distance array 114, and the value "2" in the count distance array 110 (position two) may be modified to a "4" in the corrected distance array 114. Each of the values in positions zero to two of the count distance array 110 may be incremented by two.

Notably, the value of two is not added to all positions of the count distance array 110 to generate the corrected distance array 114. The value of two is added to each element in the count distance array 110 until the second zero element at position four is reached. That is, a value of "0" for the count distance resets the count distance values that follow thereafter. The first zero element is set to be zero speculatively and is not always set correctly, and is thus ignored as being a resetting distance value. Therefore, the second zero element is considered to be the first "resetting element." Therefore, the fourth-eighth positions have values of the corrected distance array 114 that are the same as the fourth-eighth positions of the count distance array 110.

The process 100 may generate output values 118 based on the corrected distance of the corrected distance array 114 to execute vectorized computations 116. In detail, the vectorized computations may include utilization of a vector API to generate a vector of random numbers which may enhance efficiency and reduce latency. The corrected distance array 114 may be used to execute vectorized computations. For example, the corrected distance array 114 may be used to indicate storage locations of values and/or values to be used during vectorized execution (e.g., values with even distances go to X array location, values with odd distances go to Y array location, etc.). As another example, the corrected distance array 114 may store values that are to be consumed during the vectorized operations. The output values 118 may include X array values 118a and Y array values 118b. The corrected distance array 114 may determine values that are stored in the X array values 118a and Y array values 118b.

Figure 2:
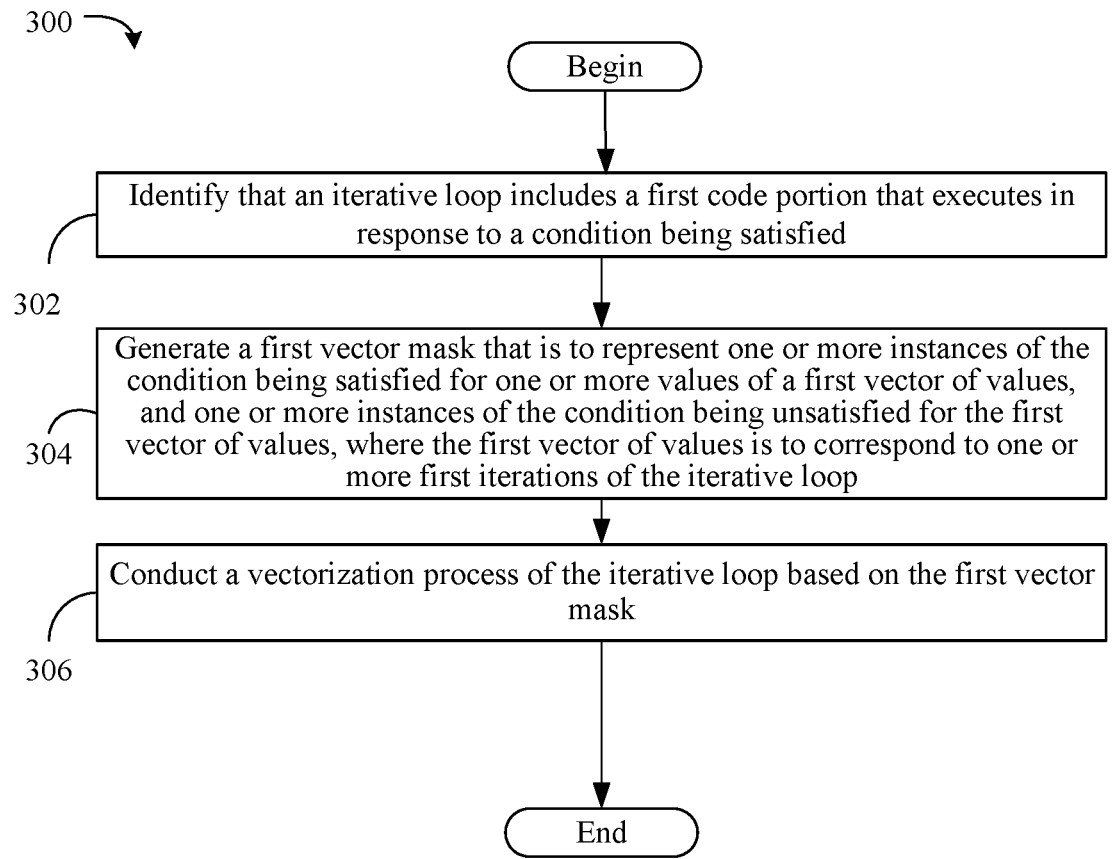
FIG. 2 is a flowchart of an example of a method of conducting a vectorization process according to an embodiment.

FIG. 2 shows a method 300 of conducting a vectorization process. In an embodiment, the method 300 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 302 identifies that an iterative loop includes a first code portion that executes in response to a condition being satisfied. In some embodiments, the condition may be part of a conditional statement of the iterative code. Illustrated processing block 304 generates a first vector mask that is to represent one or more instances of the condition being satisfied for one or more values of a first vector of values, and one or more instances of the condition being unsatisfied for the first vector of values, where the first vector of values is to correspond to one or more first iterations of the iterative loop. Illustrated processing block 306 conducts a vectorization process of the iterative loop based on the first vector mask.

FIG. 3A shows an example of computer code 350 (e.g., a counting distance pattern code) that may be enhanced for vectorized execution. The code 350 computes a number of iterations (which may correspond to distances described herein) to the nearest preceding iteration where condition (i) 356 was not satisfied and outputs these distances to array x 354. Break points may be the iterations where condition (i) 356 is not satisfied and the distance (i.e. the value of "k") is zeroed 358. Notably, the conditional statement of condition (i) 356 provides uncertainty when the value k will be incremented or zeroed, and what value will be stored.

FIG. 3B illustrates a more detailed analysis of a vector chunk of the computer code 350 to determine distances to a nearest preceding condition unmet value (e.g., the value "0"). A table 360 illustrates various portions of the analysis. Input row 362 indicates whether the condition is satisfied or unsatisfied at a particular offset 368. Input 362 may correspond to a "k-mask" or vector mask. A "0" in the input row 362 means the condition is unsatisfied, while a "1" in the input row 362 means that condition is satisfied. Rows 364 illustrate various operations and commands that may be executed to calculate a vector of distances, also referred to as "Vdistance", 366. The offset 368 may refer to a position (e.g., a column) within the table 360. For example, position zero of offset 368 may have a "1" value for the input row 362 and a "0" value for the Vdistance 366.

The Vdistance 366 measure the distance to the nearest preceding "0" in the input row 362. The nearest preceding "0" may mean a "0" in the input row 362 that is located at a prior position of the offset 368 that is prior to a current position of the offset 368 that a given element of Vdistance 366 will be stored within. The value of the given element of Vdistance 366 may be a number of positions of the offset 368 that are between the prior position and the current position.

If there is no preceding "0" in the input row 362 for the current position, then a new offset position may be generated. For example, the input row 362 may be concatenated with preceding "0." In doing so, the Vdistance 366 may be calculated based on a value of "0" is effectively in a negative one (i.e., "−1") position of the offset 368 (unillustrated), and/or one position to the right of position zero the offset 368.

For example, the Vdistance 366 in position six of the offset 368 is set to the value "2" because the nearest preceding "zero" of the input row 362 is two positions away or at position three of the offset 368. As another example, the Vdistance 366 in position two of the offset 368 is set to the value "2" because there is no nearest preceding "zero" in the input row 362. In detail, a "0" may be added at an offset 368 position immediately to the right of offset 368 position "0" (e.g., position "−1"). Thus, the distance between position two of offset 368 and position negative one offset 368 is 2, and thus the Vdistance 366 that corresponds to offset 368 position two will be value two. It is worthwhile to note that the "0" at offset 368 position "−1" may only be used to calculate the Vdistance 366 under certain circumstances described above, and may not utilized for any other computations. Thus, the "0" at offset 368 position negative one may be discarded after the calculation of the appropriate Vdistance 366.

The offsets 368 may correspond to a number of elements in a vector or vector chunk. Thus, in this particular example, a vector or vector chunk may have eight elements, however it will be understood that different numbers of elements and vector sizes may be used without departing from the scope of the embodiments described herein. It is worthwhile to also note that rows 364 include a sequence of 4 AVX512 instructions, which may be referred to as "CountRightZeroDist," which counts distances to the nearest preceding zero in an input k-mask, (i.e., distance to the iteration, where dependency k++ breaks off). AVX512 may be 512-bit extensions to a 256-bit Advanced Vector Extensions to single instruction, multiple data (SIMD) instructions for x86 instruction set architecture (ISA). Other types of instructions may be utilized depending on the underlying architecture of a computing system.

Figure 3C:
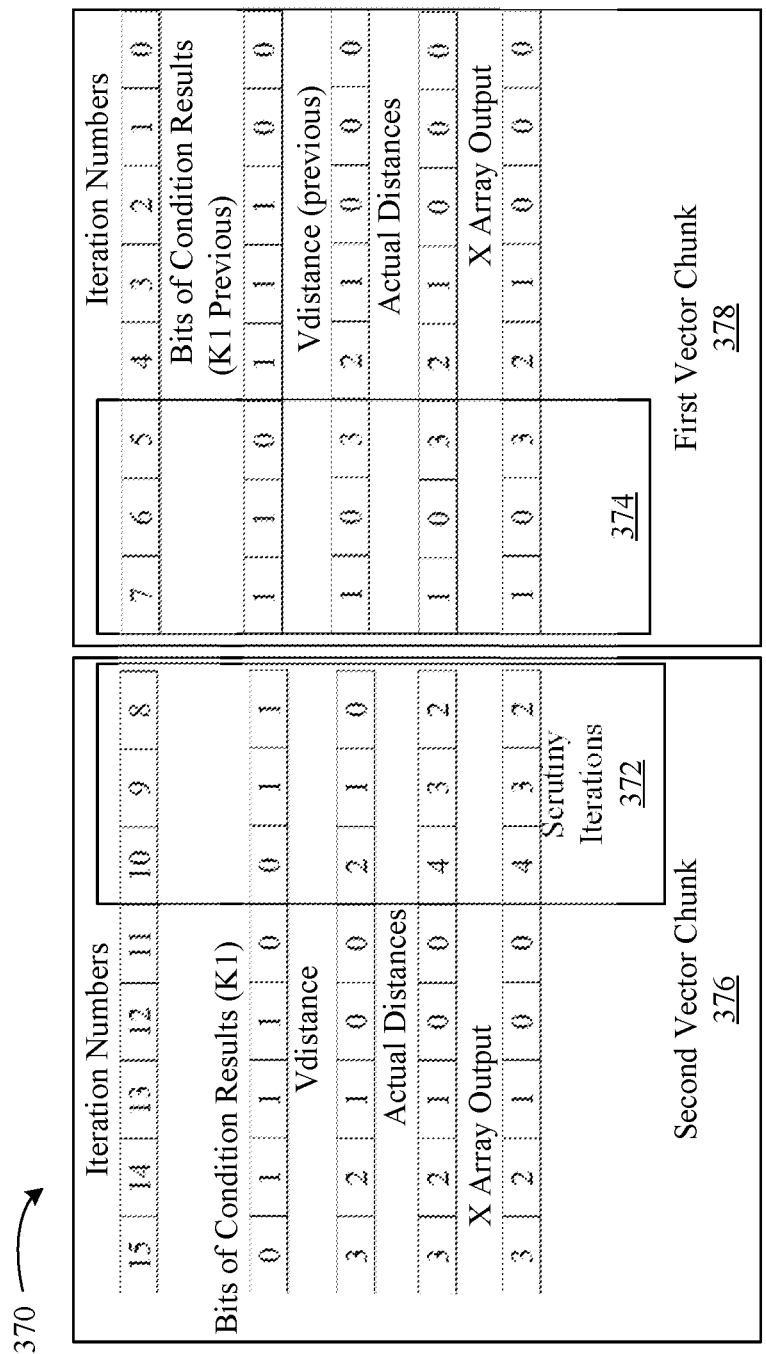
FIG. 3C shows an analysis of the first and second vector chunks of the computer code according to an embodiment.

FIG. 3C shows an analysis of the first and second vector chunks 378, 376 of the code 350 of FIG. 3A side by side in table 370. Portions of table 360 are incorporated into the second vector chunk 376. That is, the table 360 may correspond to the second vector chunk 376. The analysis includes a mask of condition results for the first vector chunk 378 of 8 iterations (K1_previous) as an input, then an operation (e.g., CountRightZeroDist) may produce vector of distances (Vdistance (previous)) of the first vector chunk 378.

If a "zero" value is not met while scanning from i-th bit to the right, some operations (e.g., CountRightZeroDist) will return position number (i) for this bit as if 0 was immediately preceding in the K1_previous (e.g., the mask). Such operations may execute properly over the first vector chunk 378 so that the resulting vector of Vdistance exactly matches the actual distances for the first vector chunk 378. For example, the first vector chunk 378 may be the first iterations of the computer code 350. Such operations may not execute with absolute precision on the second vector chunk 376 resulting in a vector for the Vdistance that differs from a resulting corrected output for the first 3 elements (e.g., up to positions including the first 0 in the bits of the condition results k1).

That is, the scrutiny iterations 372 may include the iterations 8-10 in the second vector chunk 376 that are the iterations including the first 0 bit (iteration 10) in the bits of the condition result k1 mask and any preceding iterations (iterations 8 and 9) that precede the first 0 bit. That is, since there are preceding 1's in k1 Previous, which were not taken into consideration, the Vdistance values of the scrutiny iterations 372 should be modified to the actual distances and based on the preceding 1's in k1 Previous. These incorrect elements may be selected and updated by adding a base distance from the first vector chunk 378. In this particular example, the Vdistance values of the scrutiny iterations 372 may be updated based on the bits of condition results (K1 previous) of the fifth, sixth and seventh iterations 374 of the first vector chunk 378 and/or Vdistance (previous) of the seventh iteration of the first vector chunk 378.

For example, a value of two may be added to the Vdistance values of the scrutiny iterations 372. The value two may correspond to a number of the iterations (or bit positions in some embodiments) of the first vector chunk 378 that are traversed from the highest iteration number (e.g., $7^{th}$ iteration) towards the lowest iteration number (e.g., $0^{th}$ iteration) until the first "0" bit is reached in the bits of the condition results (K1_Previous). In this particular example, the two iterations (iteration 7 and iteration 6) are traversed until the first "0" bit is reached at iteration 5. Thus, the number is set to two. In some embodiments, such traversing may be done by counting leading zeroes of a negated K1_Previous mask (e.g., an inverted K1_Previous mask). The value two for the base distance may also be derived from the Vdistance (previous). For example, the value of the Vdistance (previous) in iteration 7 may be incremented by one (to account for the bit value of the K1 Previous being a value of "1") and added to the Vdistance values of the scrutiny iterations 372 of the second vector chunk 376 to generate the actual distances.

Notably, the iterations 11-15 of the second vector chunk 376 are not adjusted based on the first vector chunk 378 since the iteration number 10 has a value of 0 in the bits of condition results (K1) that breaks continuity with the first vector chunk 378 (resets the current distance value to 0). The X array output of the second vector chunk 376 may be the same as the actual distances of the second vector chunk 376. Thus, during vectorization operations, the X array output of the second vector chunk 376 may be determined based on the actual distances of the second vector chunk 376. For example, the actual distances may be passed into the vector operation and used to determine the X array outputs for the correct indices of the X array.

It is worthwhile to note that Vdistance and Vdistance (previous) may be a result of a "CountRightZeroDist" operation. The "CountRightZeroDist" operation was described above and further description is omitted for brevity.

FIG. 3D shows exemplary commands and operations to execute a vectorization process on the computer code 350. That is, FIG. 3D shows a detailed series of commands and operations in the form of a table 390 that may select and update the Vdistance values of the scrutiny iterations 372 of FIG. 3C to the actual distances. As illustrated, K3 includes values 392 that are set to 1. The values 392 may correspond to the scrutiny iterations 372. K3 may be a mask that holds set up bits for scrutiny iterations 372 of FIG. 3C, and unset bits for all other iterations 11-15 of FIG. 3C. In one embodiment this mask can be generated by sequence of two instructions, such as K2=K1+1 and K3=KXOR(K1, K2). As described above, the base distance preserved from the first vector chunk 378 is 2, as there are two leading ones in section 394 of K1_previous mask. In this example the base distance is counted by leading zeroes of section 396 of negated K1_previous mask. The value "2" of base distance may then be broadcasted to the vtmp vector of correction analysis iterations 398 which correspond to the scrutiny iterations 372 of FIG. 3C. Afterwards, the value two may be added to each of the Vdistance values of the correction analysis 398 to arrive at the actual Vdistance values of the correction analysis 398.

A vectorized loop that corresponds to code 350 of FIG. 3A that is processed in accordance with the above described may be presented as the following pseudo-code:

Pseudocode Example

```
base_dist = 0;
for(i=0; i<N; i+=VL){
    k1 = vector_condition(i);
    vdistance = CountRightZeroDist(k1);
    k3 = kxor(k1+1, k1);
    vtmp{k3}{z} = broadcast(base_dist);
    vdistance{k3} = vadd(vdistance, vtmp);
    vstore(X+i, vdistance);
    base_dist = lzcnt(knot(k1));
}
```

FIG. 4A illustrates a computer code 400 that includes an example of a dependency represented by loop 402 (e.g., a conditional random number generation loop). The loop 402 consumes an input sequence of values (e.g. sequence of pseudo/quasi random numbers) and conditionally divides values into 2 bins at input and output sequences 404 and 408 based on condition 406. Conventional implementations may not identify prior to execution, how many values will be consumed by vector chunks of iterations or by the whole loop 402. Further, an output sequence 408 consumes values from the same input sequence 404. That means existence of dynamic data dependency of a given loop iteration from the previous one. Thus, if there is a sequence of 24 random numbers, it may not be obvious which of the values will fall into X-bin and which to Y-bin without considering all previous iterations, and how many values will be in each bin.

FIG. 4B illustrates operations in a table 450 to identify whether random values will be put to the Y-bin, and at what points in the execution of the code 400. In detail, a sequence of random numbers 456 may be generated prior to vectorization operations by several vector chunks of values using a specialized vectorization application programming interface for vectorization operations. For example, the vectorization process 100 may ensure that values from all of the chunks, such as first and second chunks 468, 470, except the last chunk, such as third vector chunk 472, will be fully consumed by the code 400. This may enhance efficiency. That is, because some other implementations may not identify how many random numbers will be used, the other implementations may inefficiently adopt a model that relies on generating more random numbers than will likely be needed. The last chunk, such as the third vector chunk 472, may require separate processing by scalar execution or by vector execution with specific remainder mask (e.g., a number of generated values which still may be wasted is not more than the size of vector chunk).

In the condition evaluated (comparison mask) 458, a "*" value represents elements for which the condition 406 is not evaluated in scalar execution. That is, in some instances the condition 406 may be irrelevant for determining which array the random number will be distributed. For example, if the condition 406 is true, then the next random number will be stored in the Y bin. After the random number is stored in the Y bin, the following random number will be stored in the X bin regardless of the outcome of the condition. Thus, the * may be assigned to the condition mask where the random number is stored in the Y array, and thus a following random number will be stored in the X array regardless of the condition value. The output distribution 462 illustrates where the random numbers are stored (e.g., a particular array element in the X array or Y array).

Some embodiments may set the "*" values to "1" values. Doing so may result in continuous blocks of "1" values, such as in elements 452. In the block of elements 452 on even positions (0, 2, 4, 6 counted from the right border) the random number is to be stored in the X array and on odd positions (e.g., 1, 3, 5, 7 from the right border) the random numbers may be stored in the Y array. The Vdistance 460 may be determined based on the assumption that the "*" values are "1" values. The Vdistance 460 may correspond to whether a random number of the sequence of random numbers 456 is stored in the X array or the Y array as indicated above. Some embodiments described herein may illustrate that actual values of "*" may not matter for correctness of vectorization of the code 400. That is, even values of Vdistance 460 represent that the output (e.g., a random number) will be stored in the X array, while odd values of Vdistance 460 represent that the output (e.g., a random number) will be stored in the Y array.

In some embodiments, one or more "*" values of elements 452 may be interpreted as a value "0" instead of a value "1." Nonetheless, the above rules may not be changed: X-elements will correspond to even values of Vdistance 460 and Y-elements correspond to odd values of Vdistance 460.

Further, the next element to "0" in the condition evaluated (comparison mask) 458, that is the element having a Vdistance 460 value of "0", may always go the X array. Thus, this means that a value of "0" in the condition evaluated (comparison mask) 458 breaks data dependency and clears the whole pre-history of X and Y elements.

It is worthwhile to note that elements 454 of iteration number 10 span the second vector chunk 470 and the third vector chunk 472 which may require an update similar to table 390 described above, for example similar to the description of FIG. 3D. For example, e15 is stored in X array during the second vector chunk 470. Further, the condition evaluated (comparison mask) 458 indicates that the condition is met during the same iteration that e15 is stored in the X array. If the third vector chunk 472 was unaware that the condition was met in e15, then the random number e16 may be stored in the X array rather than the Y array, which would be an error. To address that, a base distance is computed by counting leading "1"s in comparison mask 458 of the second vector chunk 470 and added to the elements of the third vector chunk 472 which identified by a correction analysis similar to described above with respect to correction analysis 398. In contrast, some embodiments may provide pre-history of the first, second and third vector chunks 468, 470, 472 through the condition evaluated (comparison mask) 458 and Vdistance 460. The generation of the condition evaluated (comparison mask) 458 and the Vdistance 460 may thus allow for accurate computations during the execution of the first, second and third vector chunks 468, 470, 472.

Thus, during execution of the first, second and third vector chunks 468, 470, 472 determining whether the Vdistance 460, which counts to the nearest zero in the condition evaluated (comparison mask) 458, is odd or even may allow for generation of X mask 464 and Y mask 466. For example, when the value of Vdistance 460 is odd, the Random Number will be stored in the Y array, and a value in the Y mask 466 is set to "1" to indicate that the random number will be stored in the Y array. Further, when the value of Vdistance 460 is even, a random number will be stored in the X array, and a value in the X mask 464 will be set to "1" to indicate that the Random Number will be stored in the X array. Thus, the X-mask 464 is complementary to the Y-mask 466. A processor may access or generate the X-mask 464 and Y mask 466 during execution of the first, second and third vector chunks 468, 470, 472 to compress elements to corresponding X and Y output arrays based on compress instructions.

A last vector iteration might require special processing. For example, if a total number of iterations is N=12, then the last X element is X11 and the last Y element is Y6 since some iterations may each process an X value and a Y value during the same iteration. All the other elements 474 should be masked out by additionally applying proper masks to the X-mask 464 and the Y-mask 466. Alternatively, the whole remainder can be processed in scalar way (e.g., scalar Y5, X11, Y6 elements) rather than in a vector fashion.

The following pseudocode may allow for processing of 32-bit floating point numbers according to some embodiments:

```
static __m512i countRightZeroDist(__mmask16 cmp_mask){
    __m512i vconstFFFF  = _mm512_set1_epi32(-1);
    __m512i vcount      = _mm512_set_epi32( 17, 18, 19, 20, 21, 22, 23, 24, 25, 26,
27, 28, 29, 30, 31, 32);
    __m512i v1          = _mm512_broadcastmw_epi32(cmp_mask);
    __m512i v2          = _mm512_sllv_epi32(v1, vcount);
    __m512i v3          = _mm512_andnot_epi32(v2,vconstFFFF);
```

```
        __m512i dest      = _mm512_lzcnt_epi32(v3);
        return dest;
}
void ref065(float* x, float* y, float xIfConst){
        const int n = iter_count;
        svrng_engine_t svrng_generator = svrng_new_rand0_engine( 555 );
        svrng_distribution_t_svrng_dis =
svrng_new_uniform_distribution_float(0.0f,1.0f);
        __m512 const_05 = _mm512_set1_ps(xIfConst);
        __m512i const_one = _mm512_set1_epi32(1);
        __m512i vlanes = _mm512_set_epi32(15,14,13,12,11,10,9,8,7,6,5,4,3,2,1,0);
        __m512i vperm =
_mm512_set_epi32(15,15,15,15,15,15,15,15,15,15,15,15,15,15,15,15);
        __m512i vAddDistance = _mm512_set1_epi32(0);
        __m512 tmp_rng;
        __mmask16 x_mask,y_mask;
        int i, xPopCnt, yPopCnt, k=0;
        for(i=0; i<n;)
        {
                //generate vector of random numbers
                tmp_rng = svrng_generate16_float(svrng_generator, svrng_dis);
                //generate mask with condition results for each element
                __mmask16 cmp_mask = _mm512_cmp_ps_mask(tmp_rng, const_05,
_CMP_GT_OS);
                //count distances to the nearest right zero assuming distance of
cmp_mask[0]==0
                __m512i distances = countRightZeroDist(cmp_mask);
                //compute mask for elements lower and including position of the first 0 in
cmp_mask
                __mmask16 ones_mask = _kxor_mask16(cmp_mask+1, cmp_mask);
                //add distance from the previous iteration, i.e. if distance(cmp_mask[0])!=0
                distances = _mm512_mask_add_epi32(distances, ones_mask, distances,
vAddDistance);
                //Y elements have odd distance to nearest zero
                y_mask = _mm512_test_epi32_mask(distances, const_one);
                x_mask = _knot_mask16(y_mask); //X elements are the rest
                //count how many X elements are in this vector, this is also a number of
iterations
                xPopCnt = _mm_popcnt_u32(x_mask);
                //count how many Y elements are in this vector
                yPopCnt = _mm_popcnt_u32(y_mask);
                //prepare initial distance to add for the next iteration
                distances = _mm512_maskz_add_epi32( cmp_mask, distances, const_one );
                //broadcast it to the whole vector
                vAddDistance = _mm512_permutexvar_epi32( vperm, distances );
                if((i + xPopCnt) >n){
//number of X elements generated is more than required for the loop, need to mask
out excess
                        __m512i vec1 = _mm512_maskz_expand_epi32(x_mask,
_mm512_add_epi32(_mm512_set1_epi32(i), vlanes));
                        //mask to remove excessive X-elements
                        __mmask16 mask1 = _mm512_mask_cmplt_epi32_mask(x_mask, vec1,
_mm512_set1_epi32(n));
                        __mmask16 mask2 = _mm512_mask_cmplt_epi32_mask(x_mask, vec1,
_mm512_set1_epi32(n+1));
                        //mask to remove excessive Y-elements
                        __mmask16 mask3 = _kxor_mask16(mask1, mask2) - 1;
                        x_mask = _kand_mask16(x_mask, mask1); //mask out excessive X-
elements
                        y_mask = _kand_mask16(y_mask, mask3); //mask out excessive Y-
elements
                        vAddDistance = _mm512_set1_epi32(0); //no need to pass history to the
next iteration since this is the last one
                }
                //compress X-elements to memory
                _mm512_mask_compressstoreu_ps( x+i, x_mask, tmp_rng );
                //compress Y-elements to memory
                _mm512_mask_compressstoreu_ps( y+k, y_mask, tmp_rng );
                i += xPopCnt; //prepare X pointer to the next iteration
                k += yPopCnt; //prepare Y pointer to the next iteration
        }
        //check if one Y-element left to generate
        __mmask16 yFlag = _mm512_test_epi32_mask(vAddDistance, const_one);
        if(yFlag){ //generate the last Y-element if needed
                y[k] = svrng_generate_float(svrng_generator, svrng_dis);
        }
}
```

Figure 5:
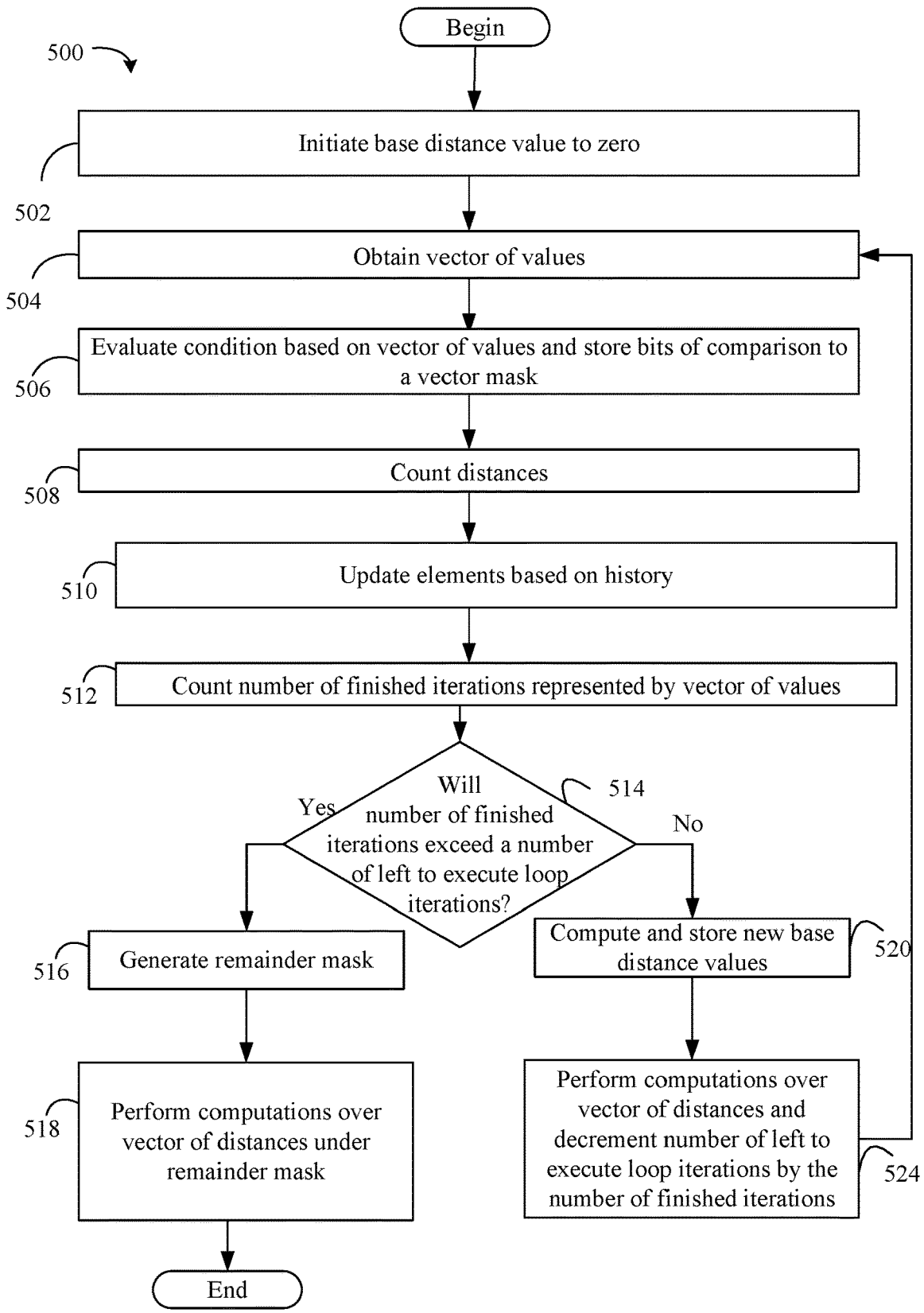
FIG. 5 is a flowchart of an example of a method of vectorization of an iterative loop according to an embodiment.

FIG. 5 shows a method 500 of vectorization of an iterative loop. The method 500 may be readily implemented with any of the embodiments described herein. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 initiates a base distance to a value of zero. The base distance may correspond to a number of values with satisfied conditions since a condition was unsatisfied last time in a previous vector (chunk) of values. Illustrated processing block 504 obtains a vector of values. The vector may be loaded from memory or generated to evaluate a condition of the iterative loop. Illustrated processing block 506 evaluates the condition based on the vector of values and stores bits of the comparisons to a vector mask. Illustrated processing block 508 counts distances to the nearest preceding zero (when the condition was last unsatisfied) in the vector mask, and stores the distances to a vector of distances. Illustrated processing block 510 updates elements based on a history (e.g., from previous vector chunks). Illustrated processing block 510 may include selecting elements in the vector of distances, which require updates from pre-history, and add base distance value(s) to the selected elements.

Illustrated processing block 512 counts a number of finished iterations represented in the vector of values. Notably, only finished iterations are counted. For example, and referring to FIG. 4B, the second vector chunk 470 represents only 5 iterations (5-9), since iteration number 10 is not finished and requires one more value from the third chunk 472 to be finished. The number of finished iterations may represent a total number of iterations that may be processed up to the end by using a vector of values. The number of left to execute loop iterations may be at first be set to a total number of expected loop iterations, and decremented as described below.

Illustrated processing block 514 determines whether the number of finished iterations represented in the vector of values will exceed a number of left to execute loop iterations (e.g., remaining iterations). That is, as illustrated in FIG. 4B, if the vectorization chunk operates over a certain number of datasets (e.g., 8 data sets here), the third vector of values represented by third vector chunk 472 may represent 5 finished iterations (e.g., iterations 10, 11, 12, 13, 14) which is the number of finished iterations. Noteworthy, iteration 15 is not finished since condition is satisfied on e23 and one more value is required to finish the iteration. There are only 2 loop iterations left to execute (iterations 10 and 11), hence the number of left to execute loop iterations is exceeded by the number of finished iterations. If so, illustrated processing block 516 generates a remainder mask to mask unused trips, that correspond to elements e19-e23 of the third vector chunk 472 on FIG. 4B, that are not needed to process the vector or values, and illustrated processing block 518 performs computations over vector of distances under the remainder mask.

Otherwise, illustrated processing block 520 computes and stores new base distance values. Illustrated processing block 524 performs computations over a vector of distances and decrements the number of left to execute loop iterations by the number of finished iterations that have been completed by the vector.

Figure 6:
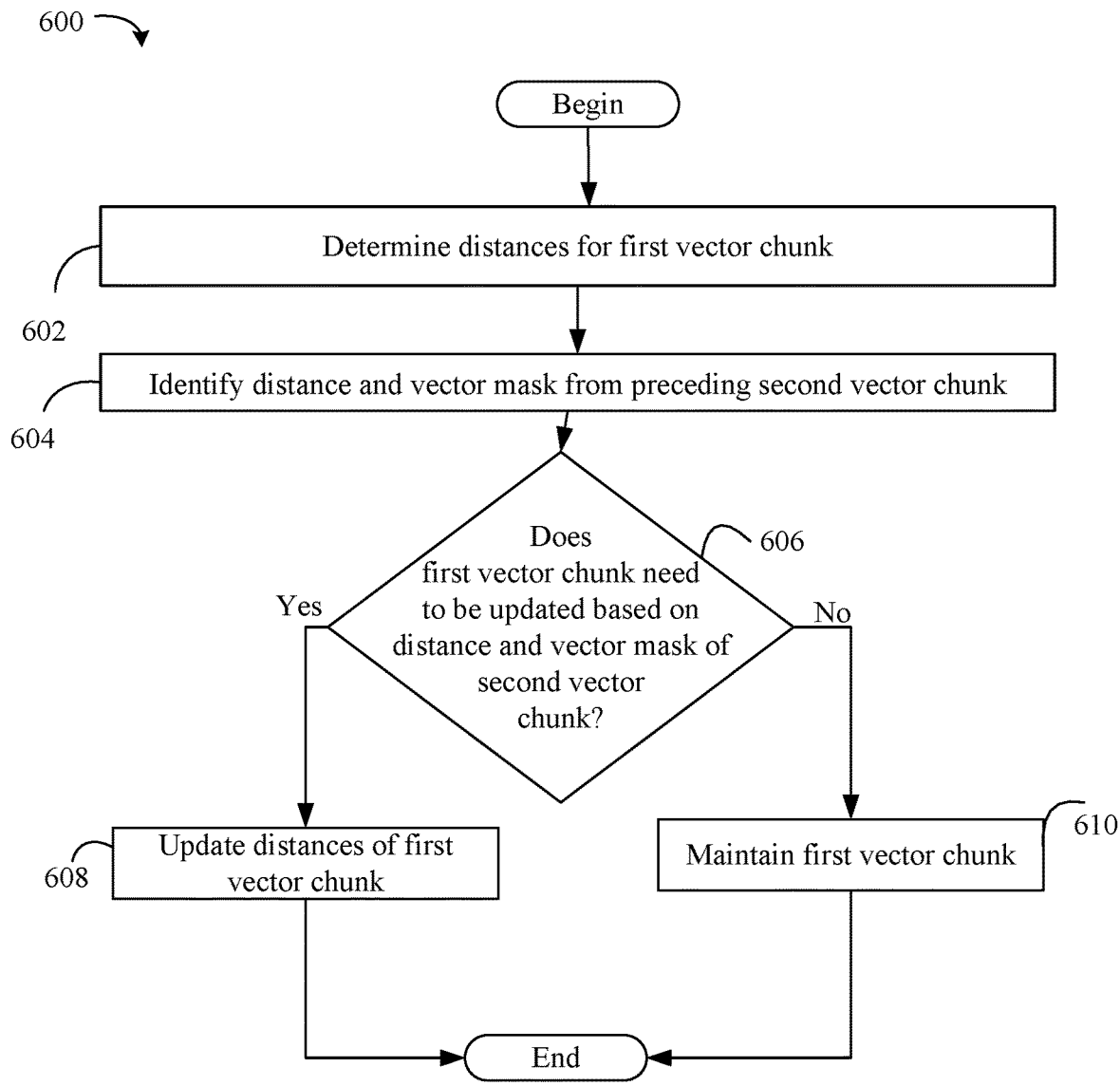
FIG. 6 is a flowchart of an example of a method of updating distances of a vector chunk according to an embodiment.

FIG. 6 shows a method 600 of updating distances of a vector chunk. The method 600 may be readily implemented with any of the embodiments described herein. More particularly, the method 600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 602 determines distances for a first vector chunk. Illustrated processing block 604 identifies distances and vector mask from a preceding second vector chunk. The second vector chunk may directly precede the first vector chunk. Illustrated processing block 606 determines if the first vector chunk needs to be updated based on the distance and vector mask of second vector chunk. For example, the distances of the first vector chunk may need to be updated if a value in the vector mask of the second vector chunk, that directly precedes the first vector chunk, indicates that a condition is satisfied. If so, illustrated processing block 608 updates distances of the first vector chunk. Otherwise, illustrated processing block 610 maintains the first vector chunk without modifications.

Figure 7:
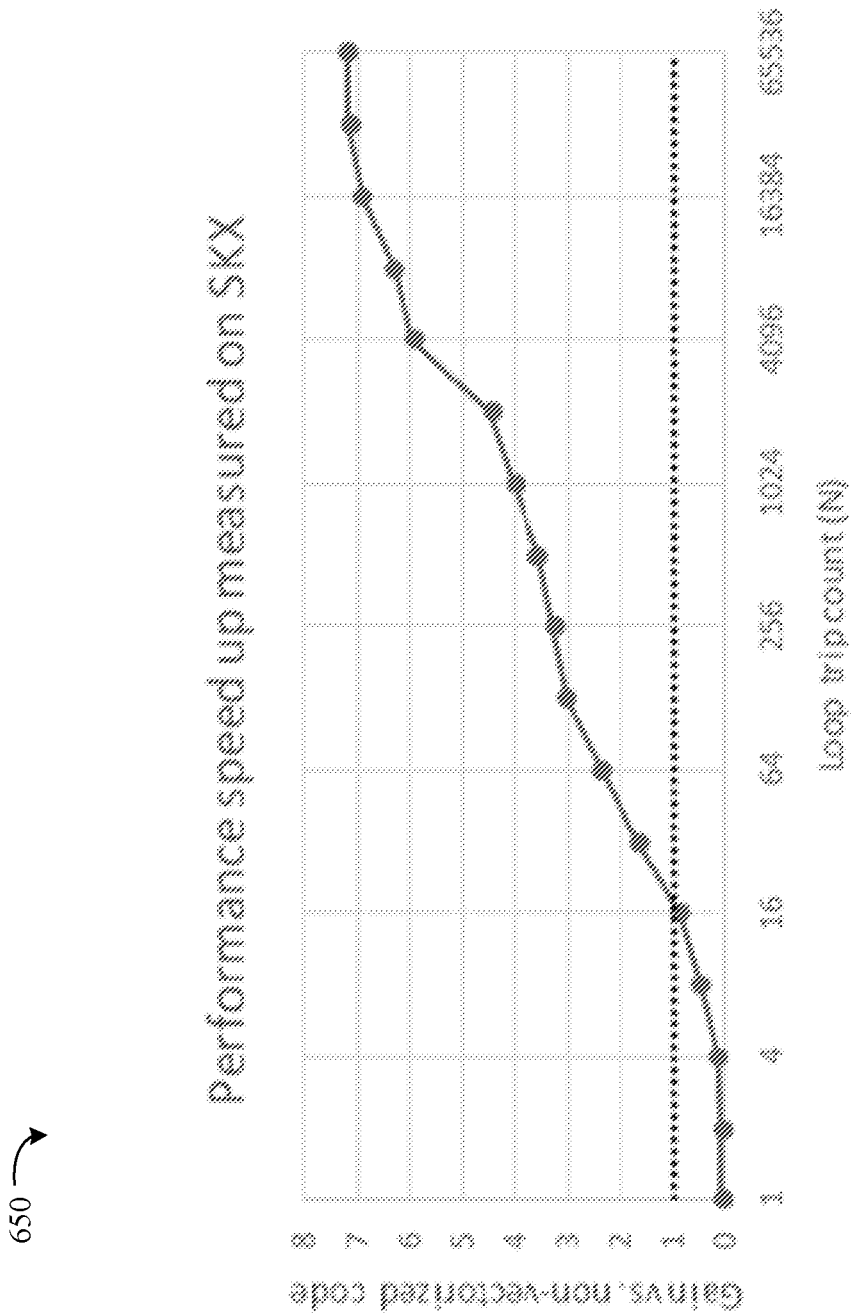
FIG. 7 is a graph of measurements of vectorized code relative to scalar code according to an embodiment.

FIG. 7 illustrates a measurement of vectorized code (the solid line) as implemented by some embodiments relative to scalar reference code (the dashed line). As illustrated in graph 650, significant gains (e.g., up to 7.2 times) are measured over scalar reference code on some processors such as SkyLake-SP (Scalable Performance) processors. Thus, embodiments may provide significant advantages over scalar implementations.

Figure 8:
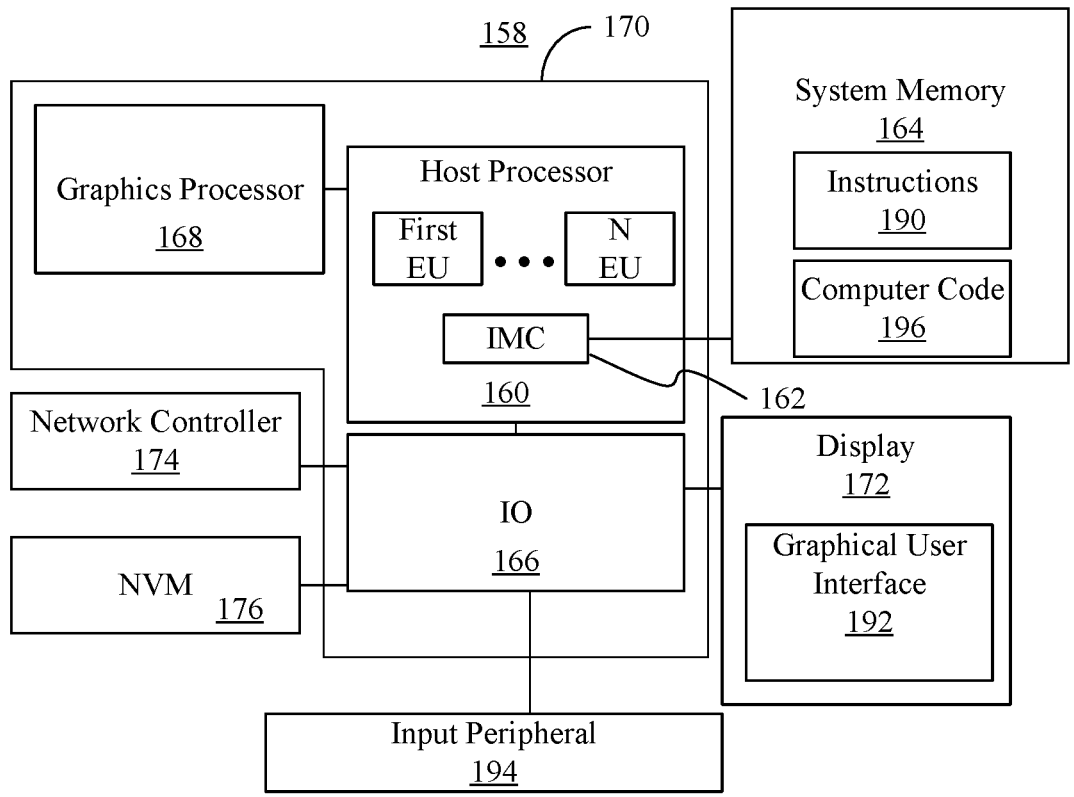
FIG. 8 is a block diagram of an example of a computing system according to an embodiment.

Turning now to FIG. 8, a performance-enhanced computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., a central processing unit with one or more processor cores) having an integrated memory controller (IMC) 162 that is coupled to a system memory 164. In the present example, the host processor includes first execution units to N execution units to support vectorization operations (e.g., single instruction, multiple data operations). Thus, the host processor 160 may be configured to execute vectorized operations.

The illustrated system 158 also includes a graphics processor 168 (e.g., graphics processing unit/GPU) and an input output (10) module 166 implemented together with the processor 160 (e.g., as microcontrollers) on a semiconductor die 170 as a system on chip (SOC), where the IO module 166 may communicate with, for example, a display 172 (e.g., touch screen, liquid crystal display/LCD, light emitting diode/LED display), a network controller 174 (e.g., wired and/or wireless), and mass storage 176 (e.g., HDD, optical disc, SSD, flash memory or other non-volatile memory/NVM). The graphics processor 168 may be configured to execute vectorized operations.

The system memory 164 includes instructions 190 which when executed by one or more of the host processor 160 or graphics processor 168, cause the computing system 158 to perform one or more aspects of the vectorization process 100 (FIG. 1), the method 300 (FIG. 2), the method 500 (FIG. 5), the method 600 (FIG. 6), and any of the embodiments, already discussed. In detail, the display 172 may present a graphical user interface 192. The graphical user interface 192 may be associated with computer code 196 that includes an iterative loop. A user may execute a command through an input peripheral 194 (e.g., a mouse, keyboard, microphone, etc.) to cause the graphical user interface 192 to execute the computer code 196.

The instructions 190 may cause one or more of the host processor 160 or the graphics processor 168 to vectorize backward cross-iteration dependent loops in the computer code 196 by generating a vector mask that identifies when conditions are satisfied and unsatisfied in the computer code 196, and distances of the vector mask. The host processor 160 may execute the vectorized code based on the distances to generate masks for processing as well as to generate and distribute values based on the masks. Thus, the computing system 158 may be considered performance enhanced in that the computing system 158 may execute the computer code 196 with fewer computer resources and in a shorter period of time by using the parallel processing techniques.

Figure 9:
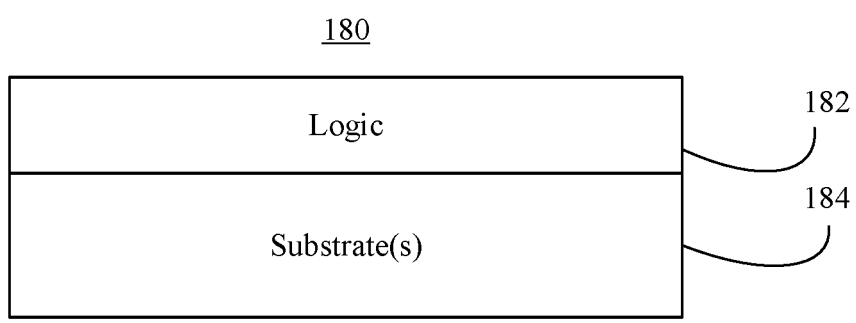
FIG. 9 is an illustration of an example of a semiconductor apparatus according to an embodiment.

FIG. 9 shows a semiconductor package apparatus 180. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement one or more aspects of the vectorization process 100 (FIG. 1), the method 300 (FIG. 2), the method 500 (FIG. 5), the method 600 (FIG. 6), and any of the embodiments, already discussed. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 10:
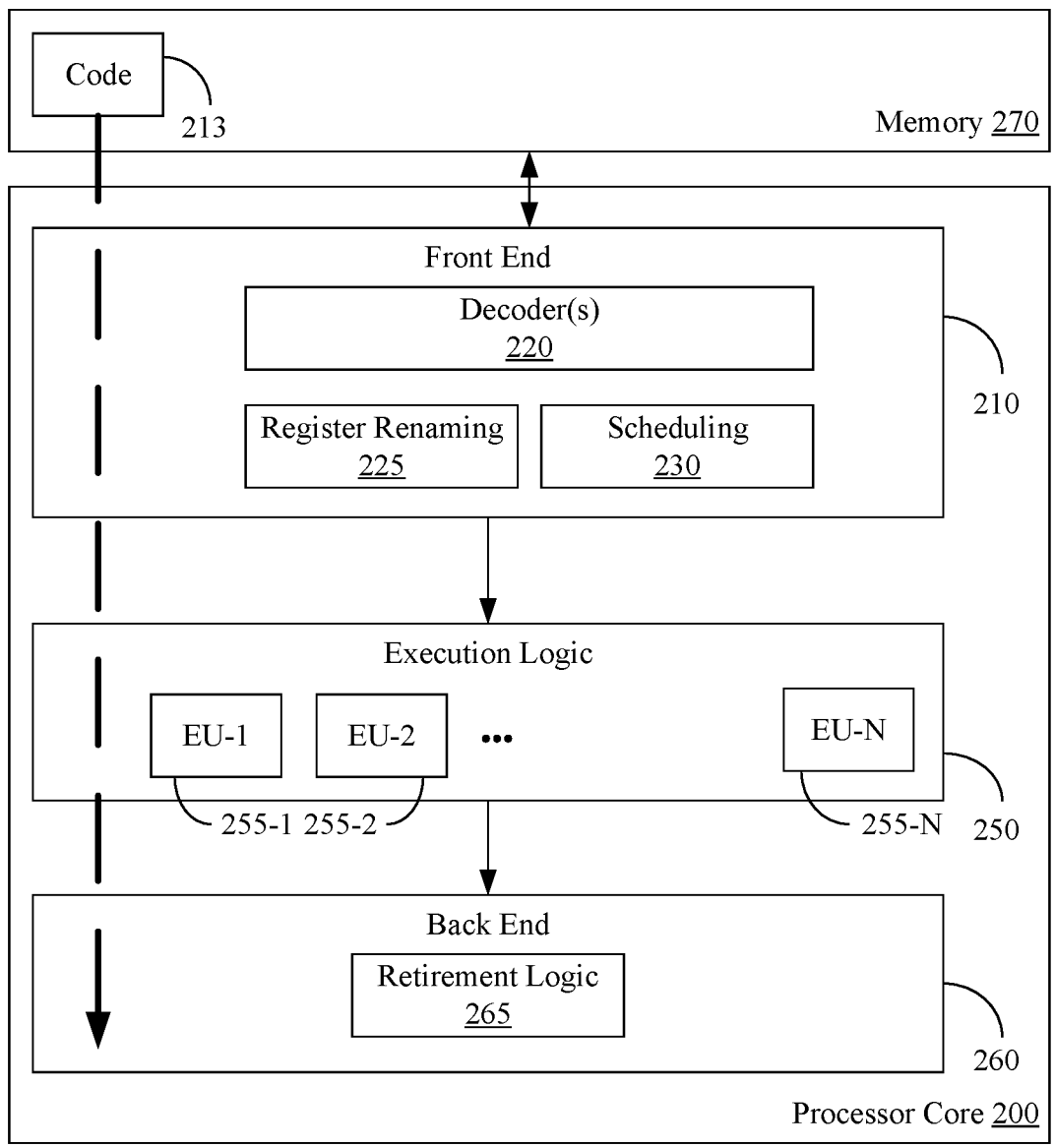
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the vectorization process 100 (FIG. 1), the method 300 (FIG. 2), the method 500 (FIG. 5), the method 600 (FIG. 6), and any of the embodiments, already discussed, already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
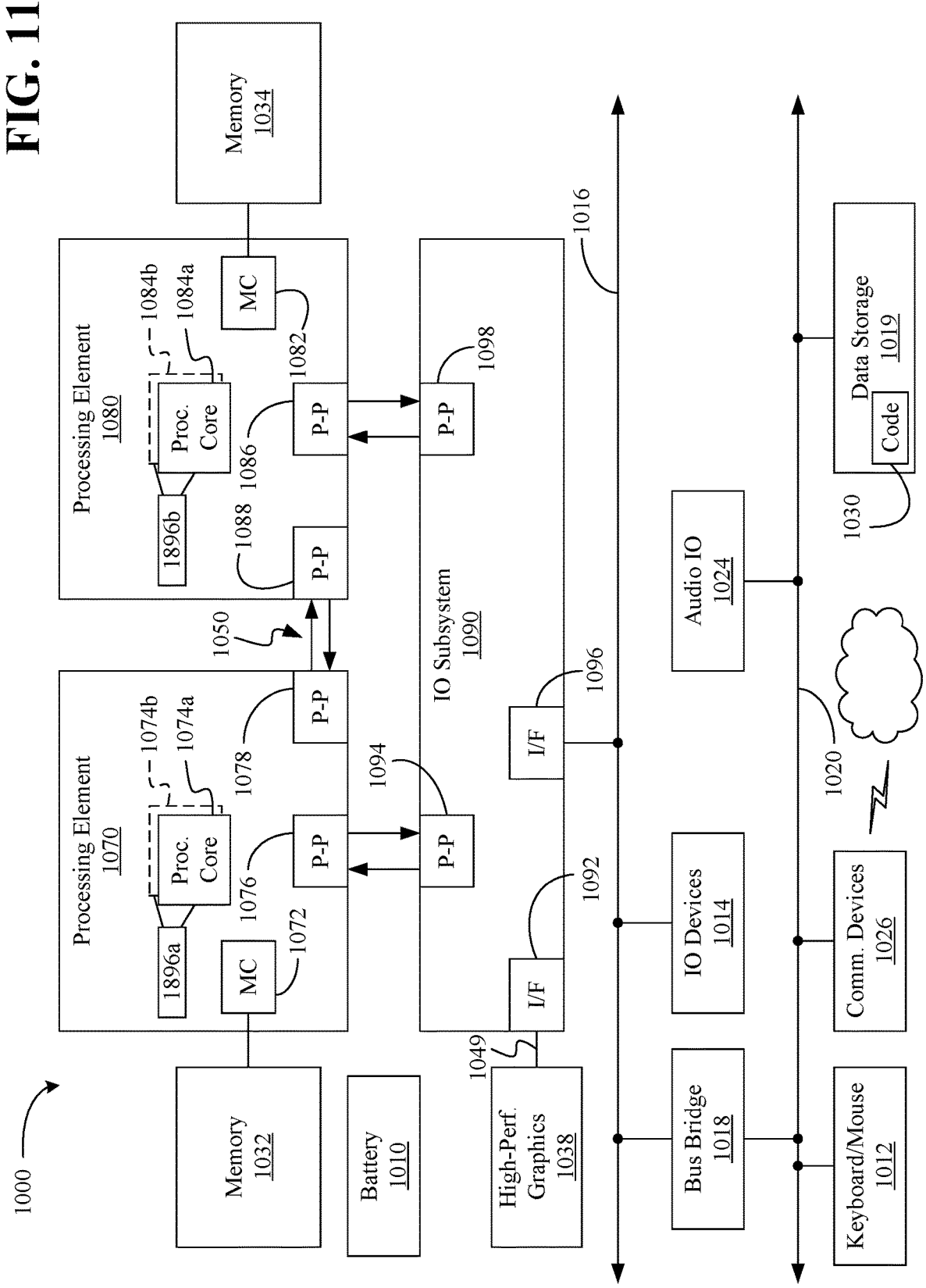
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070 of the processing elements 1070, 1080, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the vectorization process 100 (FIG. 1), the method 300 (FIG. 2), the method 500 (FIG. 5), the method 600 (FIG. 6), and any of the embodiments, already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples

Example 1 may include a computing system including a memory to store computer code that is to include an iterative loop, one or more of a host processor that is configured to execute vectorized operations or a graphics processor that is configured to execute vectorized operations, a memory including a set of instructions, which when executed by the one or more of the graphics processor or the host processor, cause the computing system to identify that the iterative loop is to include a first code portion that is to execute in response to a condition being satisfied, generate a first vector mask that is to represent one or more instances of the condition being satisfied for one or more values of a first vector of values, and one or more instances of the condition being unsatisfied for the first vector of values, wherein the first vector of values is to correspond to one or more first iterations of the iterative loop, and conduct a vectorization process of the iterative loop based on the first vector mask.

Example 2 may include the computing system of example 1, wherein the instructions, when executed, cause the computing system to determine a number of finished iterations of the first vector of values, determine a number of remaining iterations that the iterative loop is to execute, conduct an identification that the number of finished iterations is to exceed the number of remaining iterations, and generate a remainder mask in response to the identification.

Example 3 may include the system of example 2, wherein the instructions, when executed, cause the computing system to count first distances between different bit positions in the first vector mask, wherein each of the first distances is to represent a distance between a respective bit position in the first vector mask and a nearest preceding bit position in the first vector mask that is assigned a value that identifies the condition as being unsatisfied, and conduct the vectorization process based on the first distances.

Example 4 may include the system of example 3, wherein the instructions, when executed, cause the computing system to conduct an analysis of a second vector mask to determine that the first distances are to be corrected, wherein the second vector mask is to represent one or more instances of the condition being satisfied for one or more values of a second vector of values, and one or more instances of the condition being unsatisfied for the second vector of values, wherein the second vector of values is to correspond to one or more second iterations of the iterative loop, and in response to the analysis, generate corrected first distances based on a correction to the first distances based on one or more of a second distance or the second vector mask, wherein the second distance is to be determined based on the second vector mask.

Example 5 may include the system of example 4, wherein the instructions, when executed, cause the computing system to determine that that the iterative loop is to include one or more backward cross-iteration dependencies, generate the first vector mask in response to the iterative loop including one or more backward cross-iteration dependencies, and execute a vector operation based on the corrected first distances.

Example 6 may include the system of any one of examples 1-5, wherein execution of the first code portion is to cause modification of one or more of an array or a value of a variable.

Example 7 may include a semiconductor apparatus including one or more substrates, and logic coupled to the one or more substrates, wherein the logic is implemented in one or more of configurable logic or fixed-functionality logic hardware, the logic coupled to the one or more substrates to identify that an iterative loop is to include a first code portion that is to execute in response to a condition being satisfied, generate a first vector mask that is to represent one or more instances of the condition being satisfied for one or more values of a first vector of values, and one or more instances of the condition being unsatisfied for the first vector of values, wherein the first vector of values is to correspond to one or more first iterations of the iterative loop, and conduct a vectorization process of the iterative loop based on the first vector mask.

Example 8 may include the apparatus of example 7, wherein the logic coupled to the one or more substrates is to determine a number of finished iterations of the first vector of values, determine a number of remaining iterations that the iterative loop is to execute, conduct an identification that the number of finished iterations is to exceed the number of remaining iterations, and generate a remainder mask in response to the identification.

Example 9 may include the apparatus of example 8, wherein the logic coupled to the one or more substrates is to count first distances between different bit positions in the first vector mask, wherein each of the first distances is to represent a distance between a respective bit position in the first vector mask and a nearest preceding bit position in the first vector mask that is assigned a value that identifies the condition as being unsatisfied, and conduct the vectorization process based on the first distances.

Example 10 may include the apparatus of example 9, wherein the logic coupled to the one or more substrates is to conduct an analysis of a second vector mask to determine that the first distances are to be corrected, wherein the second vector mask is to represent one or more instances of the condition being satisfied for one or more values of a second vector of values, and one or more instances of the condition being unsatisfied for the second vector of values, wherein the second vector of values is to correspond to one or more second iterations of the iterative loop, and in response to the analysis, generate corrected first distances based on a correction to the first distances based on one or more of a second distance or the second vector mask, wherein the second distance is to be determined based on the second vector mask.

Example 11 may include the apparatus of example 10, wherein the logic coupled to the one or more substrates is to determine that that the iterative loop is to include one or more backward cross-iteration dependencies, generate the first vector mask in response to the iterative loop including one or more backward cross-iteration dependencies, and execute a vector operation based on the corrected first distances.

Example 12 may include the apparatus of any one of examples 7-11, wherein execution of the first code portion is to cause modification of one or more of an array or a value of a variable.

Example 13 may include the apparatus of any one of examples 7-11, wherein the logic coupled to the one or more substrates includes transistor channel regions that are positioned within the one or more substrates.

Example 14 may include at least one computer readable storage medium including a set of instructions, which when executed by a computing device, cause the computing device to identify that an iterative loop is to include a first code portion that is to execute in response to a condition being satisfied, generate a first vector mask that is to represent one or more instances of the condition being satisfied for one or more values of a first vector of values, and one or more instances of the condition being unsatisfied for the first vector of values, wherein the first vector of values is to correspond to one or more first iterations of the iterative loop, and conduct a vectorization process of the iterative loop based on the first vector mask.

Example 15 may include the at least one computer readable storage medium of example 14, wherein the instructions, when executed, cause the computing device to determine a number of finished iterations of the first vector of values, determine a number of remaining iterations that the iterative loop is to execute, conduct an identification that the number of finished iterations is to exceed the number of remaining iterations, and generate a remainder mask in response to the identification.

Example 16 may include the at least one computer readable storage medium of example 15, wherein the instructions, when executed, cause the computing device to count first distances between different bit positions in the first vector mask, wherein each of the first distances is to represent a distance between a respective bit position in the first vector mask and a nearest preceding bit position in the first vector mask that is assigned a value that identifies the condition as being unsatisfied, and conduct the vectorization process based on the first distances.

Example 17 may include the at least one computer readable storage medium of example 16, wherein the instructions, when executed, cause the computing device to conduct an analysis of a second vector mask to determine that the first distances are to be corrected, wherein the second vector mask is to represent one or more instances of the condition being satisfied for one or more values of a second vector of values, and one or more instances of the condition being unsatisfied for the second vector of values, wherein the second vector of values is to correspond to one or more second iterations of the iterative loop, and in response to the analysis, generate corrected first distances based on a correction to the first distances based on one or more of a second distance or the second vector mask, wherein the second distance is to be determined based on the second vector mask.

Example 18 may include the at least one computer readable storage medium of example 17, wherein the instructions, when executed, cause the computing device to determine that that the iterative loop is to include one or more backward cross-iteration dependencies, generate the first vector mask in response to the iterative loop including one or more backward cross-iteration dependencies, and execute a vector operation based on the corrected first distances.

Example 19 may include the at least one computer readable storage medium of any one of examples 14-18, wherein execution of the first code portion is to cause modification of one or more of an array or a value of a variable.

Example 20 may include a method including identifying that an iterative loop includes a first code portion that executes in response to a condition being satisfied, generating a first vector mask that is to represent one or more instances of the condition being satisfied for one or more values of a first vector of values, and one or more instances of the condition being unsatisfied for the first vector of values, wherein the first vector of values is to correspond to one or more first iterations of the iterative loop, and conducting a vectorization process of the iterative loop based on the first vector mask.

Example 21 may include the method of example 20, further including determining a number of finished iterations of the first vector of values, determining a number of remaining iterations that the iterative loop is to execute, conducting an identification that the number of finished iterations is to exceed the number of remaining iterations, and generating a remainder mask in response to the identification.

Example 22 may include the method of example 21, further including counting first distances between different bit positions in the first vector mask, wherein each of the first distances represents a distance between a respective bit position in the first vector mask and a nearest preceding bit position in the first vector mask that is assigned a value that identifies the condition as being unsatisfied, and conducting the vectorization process based on the first distances.

Example 23 may include the method of example 22, further including conducting an analysis of a second vector mask to determine that the first distances are to be corrected, wherein the second vector mask is to represent one or more instances of the condition being satisfied for one or more values of a second vector of values, and one or more instances of the condition being unsatisfied for the second vector of values, wherein the second vector of values is to correspond to one or more second iterations of the iterative loop, and in response to the analysis, generating corrected first distances based on a correction to the first distances based on one or more of a second distance or the second vector mask, wherein the second distance is to be determined based on the second vector mask.

Example 24 may include the method of example 23, further including determining that that the iterative loop includes one or more backward cross-iteration dependencies, generating the first vector mask in response to the iterative loop including one or more backward cross-iteration dependencies; and executing a vector operation based on the corrected first distances.

Example 25 may include the method of any one of examples 20-24, wherein executing the first code portion causes modification of one or more of an array or a value of a variable.

Example 26 may include a semiconductor apparatus including means for identifying that an iterative loop includes a first code portion that executes in response to a condition being satisfied, means for generating a first vector mask that is to represent one or more instances of the condition being satisfied for one or more values of a first vector of values, and one or more instances of the condition being unsatisfied for the first vector of values, wherein the first vector of values is to correspond to one or more first iterations of the iterative loop, and means for conducting a vectorization process of the iterative loop based on the first vector mask.

Example 27 may include the apparatus of example 26, wherein the logic coupled to the one or more substrates is to include means for determining a number of finished iterations of the first vector of values, means for determining a number of remaining iterations that the iterative loop is to execute, means for conducting an identification that the number of finished iterations is to exceed the number of remaining iterations, and means for generating a remainder mask in response to the identification.

Example 28 may include the apparatus of example 27, wherein the logic coupled to the one or more substrates is to include means for counting first distances between different bit positions in the first vector mask, wherein each of the first distances represents a distance between a respective bit position in the first vector mask and a nearest preceding bit position in the first vector mask that is assigned a value that identifies the condition as being unsatisfied, and means for conducting the vectorization process based on the first distances.

Example 29 may include the apparatus of example 28, wherein the logic coupled to the one or more substrates is to include means for conducting an analysis of a second vector mask to determine that the first distances are to be corrected, wherein the second vector mask is to represent one or more instances of the condition being satisfied for one or more values of a second vector of values, and one or more instances of the condition being unsatisfied for the second vector of values, wherein the second vector of values is to correspond to one or more second iterations of the iterative loop, and in response to the analysis, means for generating corrected first distances based on a correction to the first distances based on one or more of a second distance or the second vector mask, wherein the second distance is to be determined based on the second vector mask.

Example 30 may include the apparatus of example 29, wherein the logic coupled to the one or more substrates is to include means for determining that that the iterative loop includes one or more backward cross-iteration dependencies, means for generating the first vector mask in response to the iterative loop including one or more backward cross-iteration dependencies, and means for executing a vector operation based on the corrected first distances.

Example 31 may include the apparatus of examples 26-30, wherein the means for executing the first code portion causes modification of one or more of an array or a value of a variable.

Thus, technology described herein may support enhanced vectorization operations that may execute based on API calls and/or operations. The technology may also enable a simpler, more efficient, and less latency prone execution of operations.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a memory to store computer code that is to include an iterative loop;
one or more of a host processor that is configured to execute vectorized operations or a graphics processor that is configured to execute vectorized operations;
a memory including a set of instructions, which when executed by the one or more of the graphics processor or the host processor, cause the computing system to:
identify that the iterative loop is to include a first code portion that is to execute in response to a condition being satisfied;
generate a first vector mask that is to represent one or more instances of the condition being satisfied for one or more values of a first vector of values, and one or more instances of the condition being unsatisfied for the first vector of values, wherein the first vector of values is to correspond to one or more first iterations of the iterative loop;
conduct a vectorization process of the iterative loop based on the first vector mask;
conduct an identification that a number of finished iterations of the first vector of values is to exceed a number of remaining iterations that the iterative loop is to execute; and
generate a remainder mask in response to the identification.

2. The computing system of claim 1, wherein the instructions, when executed, cause the computing system to:
determine the number of finished iterations of the first vector of values; and
determine the number of remaining iterations that the iterative loop is to execute.

3. The system of claim 1, wherein the instructions, when executed, cause the computing system to:
count first distances between different bit positions in the first vector mask, wherein each of the first distances is to represent a distance between a respective bit position in the first vector mask and a nearest preceding bit position in the first vector mask that is assigned a value that identifies the condition as being unsatisfied; and
conduct the vectorization process based on the first distances.

4. The system of claim 3, wherein the instructions, when executed, cause the computing system to:
conduct an analysis of a second vector mask to determine that the first distances are to be corrected, wherein the second vector mask is to represent one or more instances of the condition being satisfied for one or more values of a second vector of values, and one or more instances of the condition being unsatisfied for the second vector of values, wherein the second vector of values is to correspond to one or more second iterations of the iterative loop; and
in response to the analysis, generate corrected first distances based on a correction to the first distances based on one or more of a second distance or the second vector mask, wherein the second distance is to be determined based on the second vector mask.

5. The system of claim 4, wherein the instructions, when executed, cause the computing system to:
determine that that the iterative loop is to include one or more backward cross-iteration dependencies;
generate the first vector mask in response to the iterative loop including the one or more backward cross-iteration dependencies; and
execute a vector operation based on the corrected first distances.

6. The system of claim 1, wherein execution of the first code portion is to cause modification of one or more of an array or a value of a variable.

7. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
identify that an iterative loop is to include a first code portion that is to execute in response to a condition being satisfied;
generate a first vector mask that is to represent one or more instances of the condition being satisfied for one or more values of a first vector of values, and one or more instances of the condition being unsatisfied for the first vector of values, wherein the first vector of values is to correspond to one or more first iterations of the iterative loop;

conduct a vectorization process of the iterative loop based on the first vector mask;
conduct an identification that a number of finished iterations of the first vector of values is to exceed a number of remaining iterations that the iterative loop is to execute; and
generate a remainder mask in response to the identification.

8. The apparatus of claim 7, wherein the logic coupled to the one or more substrates is to:
determine the number of finished iterations of the first vector of values; and
determine the number of remaining iterations that the iterative loop is to execute.

9. The apparatus of claim 7, wherein the logic coupled to the one or more substrates is to:
count first distances between different bit positions in the first vector mask, wherein each of the first distances is to represent a distance between a respective bit position in the first vector mask and a nearest preceding bit position in the first vector mask that is assigned a value that identifies the condition as being unsatisfied; and
conduct the vectorization process based on the first distances.

10. The apparatus of claim 9, wherein the logic coupled to the one or more substrates is to:
conduct an analysis of a second vector mask to determine that the first distances are to be corrected, wherein the second vector mask is to represent one or more instances of the condition being satisfied for one or more values of a second vector of values, and one or more instances of the condition being unsatisfied for the second vector of values, wherein the second vector of values is to correspond to one or more second iterations of the iterative loop; and
in response to the analysis, generate corrected first distances based on a correction to the first distances based on one or more of a second distance or the second vector mask, wherein the second distance is to be determined based on the second vector mask.

11. The apparatus of claim 10, wherein the logic coupled to the one or more substrates is to:
determine that that the iterative loop is to include one or more backward cross-iteration dependencies;
generate the first vector mask in response to the iterative loop including the one or more backward cross-iteration dependencies; and
execute a vector operation based on the corrected first distances.

12. The apparatus of claim 7, wherein execution of the first code portion is to cause modification of one or more of an array or a value of a variable.

13. The apparatus of claim 7, wherein the logic coupled to the one or more substrates includes transistor channel regions that are positioned within the one or more substrates.

14. At least one non-transitory computer readable storage medium comprising a set of instructions, which when executed by a computing device, cause the computing device to:
identify that an iterative loop is to include a first code portion that is to execute in response to a condition being satisfied;
generate a first vector mask that is to represent one or more instances of the condition being satisfied for one or more values of a first vector of values, and one or more instances of the condition being unsatisfied for the first vector of values, wherein the first vector of values is to correspond to one or more first iterations of the iterative loop;
conduct a vectorization process of the iterative loop based on the first vector mask;
conduct an identification that a number of finished iterations of the first vector of values is to exceed a number of remaining iterations that the iterative loop is to execute; and
generate a remainder mask in response to the identification.

15. The at least one non-transitory computer readable storage medium of claim 14, wherein the instructions, when executed, cause the computing device to:
determine the number of finished iterations of the first vector of values; and
determine the number of remaining iterations that the iterative loop is to execute.

16. The at least one non-transitory computer readable storage medium of claim 14, wherein the instructions, when executed, cause the computing device to:
count first distances between different bit positions in the first vector mask, wherein each of the first distances is to represent a distance between a respective bit position in the first vector mask and a nearest preceding bit position in the first vector mask that is assigned a value that identifies the condition as being unsatisfied; and
conduct the vectorization process based on the first distances.

17. The at least one non-transitory computer readable storage medium of claim 16, wherein the instructions, when executed, cause the computing device to:
conduct an analysis of a second vector mask to determine that the first distances are to be corrected, wherein the second vector mask is to represent one or more instances of the condition being satisfied for one or more values of a second vector of values, and one or more instances of the condition being unsatisfied for the second vector of values, wherein the second vector of values is to correspond to one or more second iterations of the iterative loop; and
in response to the analysis, generate corrected first distances based on a correction to the first distances based on one or more of a second distance or the second vector mask, wherein the second distance is to be determined based on the second vector mask.

18. The at least one non-transitory computer readable storage medium of claim 17, wherein the instructions, when executed, cause the computing device to:
determine that that the iterative loop is to include one or more backward cross-iteration dependencies;
generate the first vector mask in response to the iterative loop including the one or more backward cross-iteration dependencies; and
execute a vector operation based on the corrected first distances.

19. The at least one non-transitory computer readable storage medium of claim 14, wherein execution of the first code portion is to cause modification of one or more of an array or a value of a variable.

20. A method comprising:
identifying that an iterative loop includes a first code portion that executes in response to a condition being satisfied;
generating a first vector mask that is to represent one or more instances of the condition being satisfied for one or more values of a first vector of values, and one or more instances of the condition being unsatisfied for the first vector of values, wherein the first vector of values is to correspond to one or more first iterations of the iterative loop;

conducting a vectorization process of the iterative loop based on the first vector mask;

conducting an identification that a number of finished iterations of the first vector of values is to exceed a number of remaining iterations that the iterative loop is to execute; and generating a remainder mask in response to the identification.

21. The method of claim 20, further comprising:

determining the number of finished iterations of the first vector of values; and determining the number of remaining iterations that the iterative loop is to execute.

22. The method of claim 20, further comprising:

counting first distances between different bit positions in the first vector mask, wherein each of the first distances represents a distance between a respective bit position in the first vector mask and a nearest preceding bit position in the first vector mask that is assigned a value that identifies the condition as being unsatisfied; and conducting the vectorization process based on the first distances.

23. The method of claim 22, further comprising:

conducting an analysis of a second vector mask to determine that the first distances are to be corrected, wherein the second vector mask is to represent one or more instances of the condition being satisfied for one or more values of a second vector of values, and one or more instances of the condition being unsatisfied for the second vector of values, wherein the second vector of values is to correspond to one or more second iterations of the iterative loop; and in response to the analysis, generating corrected first distances based on a correction to the first distances based on one or more of a second distance or the second vector mask, wherein the second distance is to be determined based on the second vector mask.

24. The method of claim 23, further comprising:

determining that that the iterative loop includes one or more backward cross-iteration dependencies;

generating the first vector mask in response to the iterative loop including the one or more backward cross-iteration dependencies; and executing a vector operation based on the corrected first distances.

25. The method of claim 20, wherein executing the first code portion causes modification of one or more of an array or a value of a variable.

\* \* \* \* \*